United States Patent Office 2,969,680
Patented Jan. 31, 1961

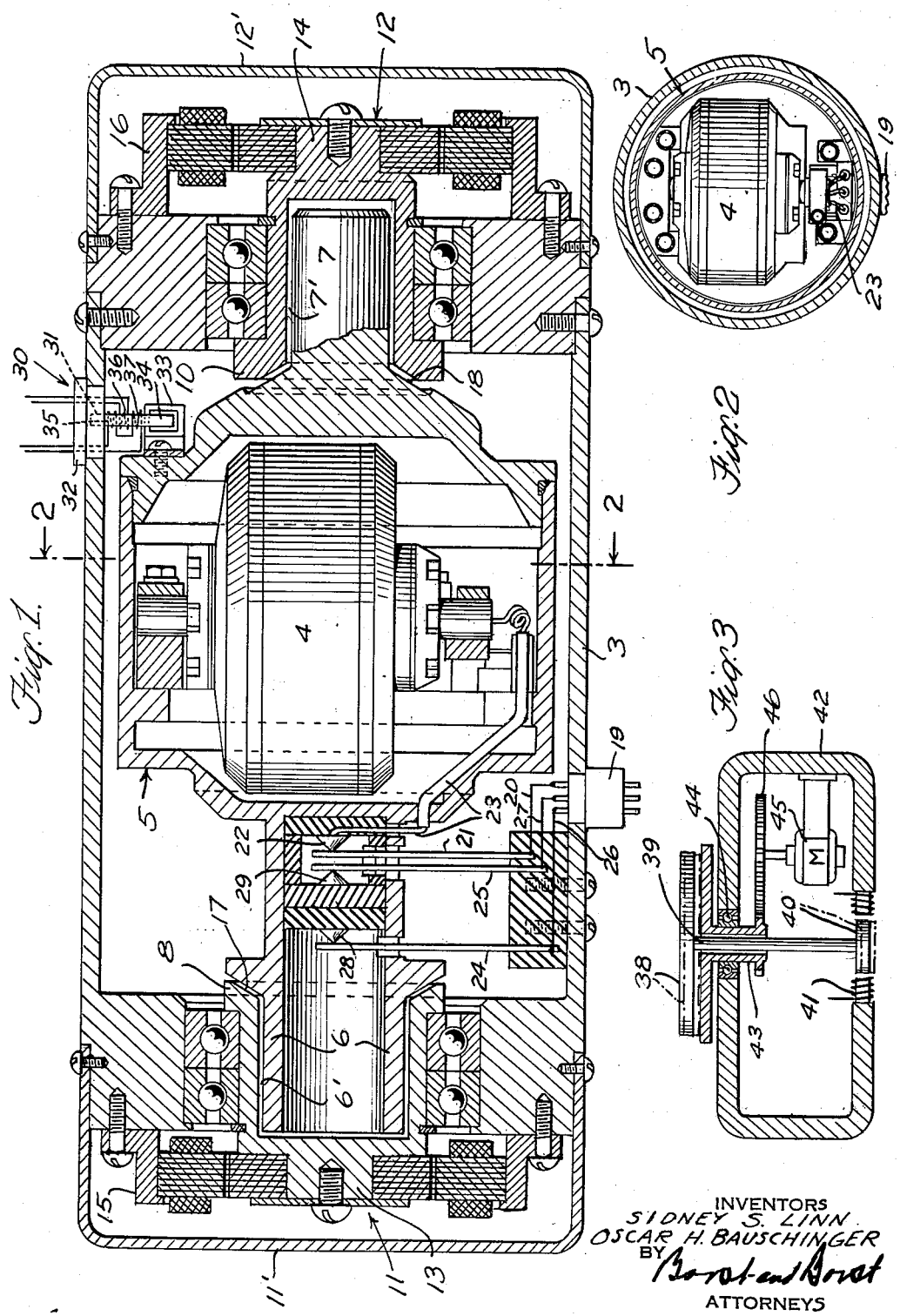

2,969,680

GYROSCOPE UTILIZING INVERTED HYDRODYNAMIC BEARINGS

Sidney S. Linn, Garden City, N.Y., and Oscar H. Bauschinger, Ridgewood, N.J., assignors to Sperry Rand Corporation, Ford Instrument Company Division, Wilmington, Del., a corporation of Delaware Filed Jan. 14, 1960, Ser. No. 2,508

6 Claims. (Cl. 74—5)

This invention relates to fluid bearings of the hydrodynamic type which are employed as axis of rotation bearings where extremely low coefficients of friction are required. A typical application for such low friction bearings are found in the gyroscope the precessing element of which mounted on its sensitive axis must be responsive to low torque. The more usual ball bearing is normally sufficient to satisfy the bearing requirements on the spin axis of the rotor driven gyro wheel. The employment of hydrostatic air bearings in gyroscopes can be prohibitively disadvantageous for some applications because of the necessity for providing an air supply. On the other hand the conventional hydrodynamic air bearing cannot be used throughout the gyro assembly because it depends on high speed rotation to create an air film cushion to support the rotating member. The precessing components in gyros are slowly rotating or oscillating and cannot create their own air cushion in this manner.

This invention contemplates the provision of a hydrodynamic bearing which can be used in connection with slowly rotating or nonrotating members. The bearing may be generally described as of the inverted type in which the axial shaft of the member is journaled in a sleeve which is driven at high speed to create the air bearing support for the member. The advantage of an extremely low friction air bearing without the necessity of providing an air supply is thus obtained.

One object of the invention is to provide an inverted, hydrodynamic air bearing for gyroscopes and the like.

Other objects and advantages of the invention may be appreciated on reading the following detailed description which is taken in conjunction with the accompanying drawings, in which Fig. 1 is a section showing the inverted hydrodynamic bearings employed in a gyroscope assembly for support of its sensitive element, Fig. 2 is a section on a reduced scale taken on line 2—2, of Fig. 1, and Fig. 3 is a modified form in section showing the inverted hydrodynamic bearing employed in connection with a controlled speed turntable for a phonograph.

Referring to Figs. 1 and 2 there is disposed within a casing 3 a gyrorotor 4 which is rotatably mounted by suitable bearing such as conventional hydrodynamic bearing (not shown) in a housing or gimbal 5 which is mounted for rotation in bearings hereinafter described. Horizontal end shafts 6 and 7 are respectively attached to each side of the housing 5 being disposed on the sensitive axis thereof.

The shafts 6 and 7 are journaled within cup bearings 8 and 10 respectively, which constitute the inverted hydrodynamic bearings for the single degree of freedom gyroscope. The cup bearings 8 and 10 are suitably rotatably mounted by ball bearings the outer races of which are secured in apertures in the end walls of the casing 3.

A rotor of motors 11 and 12 is secured to the reduced ends 13 and 14 of the cups 8 and 10 respectively, which are mounted on the free ends of shaft 6 and shaft 7 for rotation and are provided with annular and thrust air bearings 6' and 7'. The stator for each motor is mounted in a flanged ring 15 and 16 which are carried at each end of the casing 3. Each motor is provided with an end cover 11' and 12'. The motors 11 and 12 are designed to drive the rotatable cup bearings in opposite directions and at the same angular velocity so that no torque is imparted to the gyro housing 5 by the cup bearings. Each cup bearing is chamfered at its inner end and the housing 5 is provided with surfaces 17 and 18 formed in its axial shafts 6 and 7 which are complementary to the chamfered ends of the rotatable cup bearings 8 and 10 and constitute thrust bearings for the housing. The cup bearing and horizontal shaft sections of the assembly therefore provide radial and thrust bearings for the gyroscope. A three phase current for the gyromotor is fed to the gyro to an externally mounted plug 19 insulated from the casing 3. Wire lead 20 is connected to the secured end of contact arm 21 the free end of which projects through an arcuate slot in the hollow shaft 6. The contact arm bears against an insulated contact 22 to which is secured a wire lead 23 representing one of the three phase wires leading to the gyro 4. Contact arms 24 and 25 the secured ends of which are connected to wire leads 26 and 27 respectively, have their free ends bear against insulated contacts 28 and 29. Wires leading from these contacts are not shown but constitute the remaining wires of the three phase system used in the operation of the gyro. Other means of introducing three phase current into the gyro such as by slip rings are, of course, also possible.

An electromagnetic sensing device 30 is provided to detect the degree of rotational movement of the single degree of freedom gyro. This device includes an E type pickup 31 mounted in an insulation block 32 attached to the casing 3 and a coil 33 enveloping an arm 34 which constitutes an extension of the E pickup. Three coils 35, 36 and 37 are wound about the stator legs of the E pickup and serve to carry the induced output signal which is proportional to the rotational deflection of the gyro output axis from the null position shown in Fig. 1.

Referring to Fig. 3 a turntable 38 is mounted at one end of a shaft 39 to the other end of which is secured a rotor 40, the stator 41 for which is supported in field casing 42. The turntable 38 is disposed over a horizontal section of rotatable sleeve 43, the vertical section of which is disposed between the turntable shaft 39 and sleeve ball bearings 44 carried by the casing 42. A motor 45 drives the sleeve 43 through gear train 46 at a high angular velocity relative to the expected velocity of the turntable as driven by the rotor and stator 40 and 41, respectively. The turntable 38 is driven at conventional phonograph velocities being usually 16, 33⅓, 45 and 78 revolutions per minute a means of selection therefor being conventional and not shown. The relatively high speed of sleeve rotation is thus seen to enable the turntable to be supported in hydrodynamic bearings which do not require an air supply.

The vertical and horizontal sections of the sleeve 43 maintain the turntable 38 and its shaft in nonconducting relation thereto and, depending on the rotative velocity of the sleeve, causes the rotor 40 to rise into the field of the stator 41 from the broken line position to the full line position shown in the figure.

There will be other applications for the inverted hydrodyanamic bearings other than in gyroscopes and phonograph turntable assemblies as above described. Wherever they are used they may be expected to have long bearing life as compared to ball bearings and provide friction free support for the driven members as supported by the bearings. It is seen that no fluid is required as in the fluid bearing gyros in present use and, in addition, the unit may be hermetically sealed so as to enable the bearings to have space application and utility. The mechanical concept of the inverted hydrodynamic bearings as embodied in rotatably driven devices is defined in the appended claims.

What is claimed is:

1. In a gyroscopic device having a casing with a pair of longitudinally spaced end walls, a gimbal disposed within said casing between said end walls, a gyrorotor rotatably mounted in said gimbal, and bearing means by which said gimbal is mounted within said casing for slow oscillation, said bearing means comprising; a pair of axially aligned oppositely extending trunnions one of which is secured to each side of said gimbal with the axes thereof coincident with the precession axis of said device, a pair of tubular bearing sleeves into which said trunnions extend, the inside diameter of said sleeves being slightly greater than the outside diameter of said trunnions to thereby provide an annular air film space therebetween, means by which one of said sleeves is rotatably mounted in each of said end walls, and means by which said sleeves are rapidly rotated in opposite directions at the same r.p.m. thereby providing air film journal bearings for said trunnions without applying a torque to the precession axis of said device.

2. A bearing means as defined by claim 1 in which the inner ends of said tubular sleeves and said trunnions are provided with slightly spaced annular complementary cooperating surfaces thereby providing opposed air film thrust bearings for said trunnions.

3. A bearing mounting means by which a rotatable member is mounted for slow rotation, said means comprising a shaft secured to said member, a tubular sleeve into which said shaft extends, the inside diameter of said sleeve being slightly greater than the outside diameter of said shaft thereby providing an annular air film space therebetween, means by which said sleeve is rotatably mounted in a fixed support, and means by which said sleeve is rapidly rotated at high speed thereby providing an air film journal bearing for said shaft.

4. A bearing mounted means as defined by claim 3 in which one end of said sleeve and said shaft are provided with slightly spaced annular complementary cooperating surfaces thereby providing an air film thrust bearing for said shaft.

5. In a device of the character described the combination of a rotatable turntable, an axially disposed shaft secured to said turntable, a bearing sleeve in which said shaft is mounted for rotary and axial movement with respect thereto, the inside diameter of said sleeve being slightly greater than the outside diameter of said shaft thereby providing an annular air film space therebetween, means by which said sleeve is rotatably mounted in a fixed support, means by which said shaft is rotated at a relatively slow speed, and means by which said bearing sleeve is rapidly rotated at a relative high speed with respect to the rotation of said shaft thereby providing an air film journal bearing for said shaft.

6. A device of the character defined by claim 5 in which one end of said bearing sleeve is provided with a surface slightly spaced from said turntable and disposed in a plane which is substantially parallel with the opposing and coacting surface provided by said turntable thereby providing an air film thrust bearing for said shaft.

References Cited in the file of this patent

UNITED STATES PATENTS

| | | |
|---|---|---|
| 1,978,425 | Gillmor | Oct. 30, 1934 |
| 2,133,809 | Carter et al. | Oct. 18, 1938 |
| 2,314,343 | Carter | Mar. 23, 1943 |
| 2,518,159 | Martin | Aug. 8, 1950 |
| 2,577,942 | Agins | Dec. 11, 1951 |
| 2,915,902 | Brugger | Dec. 8, 1959 |